United States Patent [19]
Okabe et al.

[11] Patent Number: 5,658,536
[45] Date of Patent: *Aug. 19, 1997

[54] EXHAUST GAS PURIFYING APPARATUS

[75] Inventors: Shinichi Okabe; Tokio Kohama, both of Nishio; Tohru Yoshinaga, Okazaki; Kiyohiko Watanabe, Okazaki; Yasuyuki Kawabe, Okazaki, all of Japan

[73] Assignee: Nippon Soken, Inc., Japan

[*] Notice: The term of this patent shall not extend beyond the expiration date of Pat. No. 5,567,395.

[21] Appl. No.: 572,607

[22] Filed: Dec. 14, 1995

[30] Foreign Application Priority Data

Dec. 22, 1994 [JP] Japan ................... 6-320653

[51] Int. Cl.$^6$ ............................ B01D 53/34
[52] U.S. Cl. ................ 422/180; 422/177; 422/211; 422/222; 502/527
[58] Field of Search ......................... 422/171, 177, 422/180, 211, 222; 428/116, 593; 60/299; 502/439, 527

[56] References Cited

U.S. PATENT DOCUMENTS

| | | | |
|---|---|---|---|
| 3,755,534 | 8/1973 | Graham | 60/299 |
| 4,152,302 | 5/1979 | Nonnenmann et al. | 502/527 |
| 4,162,993 | 7/1979 | Retallick | 428/597 |
| 4,273,681 | 6/1981 | Nonnenmann | 502/527 |
| 4,987,034 | 1/1991 | Hitachi et al. | 422/180 |
| 5,258,349 | 11/1993 | Dalla Betta et al. | 502/527 |
| 5,278,125 | 1/1994 | Iida et al. | 502/439 |
| 5,456,890 | 10/1995 | Tsai et al. | 422/174 |
| 5,468,455 | 11/1995 | Bruck | 422/180 |

FOREIGN PATENT DOCUMENTS

WO93/12880  7/1993  WIPO.

*Primary Examiner*—Robert J. Warden
*Assistant Examiner*—Hien Tran
*Attorney, Agent, or Firm*—Cushman Darby & Cushman Intellectual Property Group of Pillsbury Madison & Sutro, LLP

[57] ABSTRACT

An exhaust gas purifying apparatus includes a carrier of a honeycomb structure which is made of at least one flat metal plate and at least one corrugated metal plate which is superimposed on the flat metal plate. A catalytic layer is formed on the surface of the carrier. The carrier suited for being coated with the catalytic layer is disposed in an exhaust pipe of an internal combustion engine. The carrier is provided, on an axially intermediate portion thereof, with a large number of louvers which causes a haphazard secondary motion in the exhaust gas. A predetermined portion of the carrier including the turbulence producing portion and an additional region located adjacent to said predetermined region is coated with a larger amount of catalyst than that with which the remaining portion of the carrier is coated, whereby good purifying efficiency can be obtained for a long time.

6 Claims, 2 Drawing Sheets

EXHAUST GAS PURIFYING APPARATUS

BACKGROUND OF THE INVENTION

1. Field of the Invention

The present invention relates to an exhaust gas purifying apparatus, and more particularly, it relates to an exhaust gas purifying apparatus using a metallic carrier suited to being coated with a catalyst.

2. Description of Related Art

There are various known exhaust gas purifying apparatuses for purifying exhaust gases from an internal combustion engine. For instance, a known exhaust gas purifying apparatus includes a metal carrier which carries a catalyst to accelerate chemical reactions with pollutants (HC, CO, NOx, etc.) contained in the exhaust gases, such as an oxidization or a deoxidization to thereby reduce or eliminate the pollutants during the passage of the exhaust gases therethrough. In general, a conventional metal carrier suited to being coated with a catalyst is comprised of a thin flat metal plate and a corrugated thin metal plate, which are superimposed and rolled into a honeycomb shape. The honeycomb shaped metal carrier thus produced is received and secured in a cylindrical metal casing to form a catalytic converter. Also, a carrier suited to being coated with a catalyst having a turbulence producing portion which causes a haphazard secondary motion within the exhaust gases has been recently proposed to enhance the activity of the catalyst. The turbulence caused by the turbulence producing portion within the high temperature exhaust gases contributes to an enhancement of a temperature increasing effect at the turbulence producing portion, so that the activation of the catalyst at the turbulence producing portion of the carrier can be accelerated. Consequently, the purification of the exhaust gases begins at an early stage of the starting of the engine, and accordingly, the reaction heat produced by the purification can be also effectively utilized. Thus, the catalytic converter can be activated as a whole within an extremely short space of time, in comparison with the conventional exhaust gas purifying apparatuses.

However, in the known carrier having the turbulence producing portion, as mentioned above, since the temperature of the turbulence producing portion is very high even after the activation of the catalyst, the aging of the catalyst carried by the turbulence producing portion is promoted, thus resulting in an early reduction in the exhaust gas purifying efficiency.

SUMMARY OF THE INVENTION

The primary object of the present invention is to eliminate the above-mentioned drawback in the prior art by providing an exhaust gas purifying apparatus in which the reduction in the exhaust gas purifying capability can be restricted.

To achieve the object mentioned above, according to an aspect of the present invention, there is provided an exhaust gas purifying apparatus comprising a catalyst carrier means of a honeycomb structure, including at least one flat metal plate and at least one corrugated metal plate superimposed on said flat metal plate, said catalyst carrier means defining a passageway for permitting an exhaust gas to flow therethrough, and having a surface thereof suited to being coated with catalyst, a layer of the catalyst on said surface of said catalyst carrier means, or for reducing eliminating a pollutant contained in the exhaust gas, a turbulence producing means for defining, in a portion of said surface of said catalyst carrier means as viewed in the direction of passing of said exhaust gas, a predetermined region whereat a turbulence or haphazard motion is produced in said exhaust gas flowing through said passageway of said catalyst carrier means, and the amount of the catalyst carried by the region of the catalyst carrier including at least the turbulence producing portion of the catalyst carrier being greater than the amount of the catalyst carried by the remaining region of said catalyst carrier means.

Preferably, there is no corrugated plate portion at an axially median portion of the carrier to form the turbulence producing portion.

The turbulence producing portion can be comprised of louvers.

According to another aspect of the present invention, in an exhaust gas purifying apparatus comprising a catalyst carrier means of a honeycomb structure, including at least one flat metal plate and at least one corrugated metal plate superimposed on said flat metal plate, said catalyst carrier means defining a passageway for permitting an exhaust gas to flow therethrough, and having a surface thereof suited for being coated with catalyst, means for forming a layer of the catalyst on said surface of said catalyst carrier means, so as to allow the exhaust gas to pass through said layer of the catalyst of said catalyst carrier means to thereby reduce or eliminate a pollutant contained in the exhaust gas by the action of said catalytic layer, a turbulence producing means for defining, in a portion of said surface of said catalyst carrier means as viewed in the direction of passing of said exhaust gas, a predetermined region whereat a turbulence or haphazard motion is produced in said exhaust gas flowing through said passageway of said catalyst carrier means, and said predetermined region and an additional region located adjacent to said predetermined region in said surface of said catalyst carrier means having a layer of a different catalyst having a heat resisting property which is higher than that of the catalyst in the remaining region of said surface of said catalyst carrier means.

According to still another aspect of the present invention, there is provided an exhaust gas purifying apparatus comprising a catalyst carrier means of a honeycomb structure, including at least one flat metal plate and at least one corrugated metal plate superimposed on said flat metal plate, said catalyst carrier means defining a passageway for permitting an exhaust gas to flow therethrough, and having a surface thereof suited to being coated with catalyst, means for forming a layer of the catalyst on said surface of said catalyst carrier means, so as to allow the exhaust gas to pass through said layer of the catalyst of said catalyst carrier means to thereby reduce or eliminate a pollutant contained in the exhaust gas by the action of said catalytic layer, a turbulence producing means for defining, in a portion of said surface of said catalyst carrier means as viewed in the direction of passing of said exhaust gas, a predetermined region whereat a turbulence or haphazard motion is produced in said exhaust gas flowing through said passageway of said catalyst carrier means, and an increased amount of the promoter being provided in said layer of the catalyst formed on said predetermined region and on an additional region located adjacent to said predetermined region in said surface of said catalyst carrier means in comparison with the amount of the promoter in the remaining region of said surface of said catalyst carrier means.

BRIEF DESCRIPTION OF THE DRAWINGS

The above and other objects, features, and advantages will be made more apparent from the ensuing description of the preferred embodiments in conjunction with the accompanying drawings wherein.

DESCRIPTION OF THE PREFERRED EMBODIMENTS

A first embodiment of the present invention will be discussed below.

An exhaust gas purifying apparatus according to the present invention can be advantageously used, for example, in a three-way catalytic system.

Figure 1:
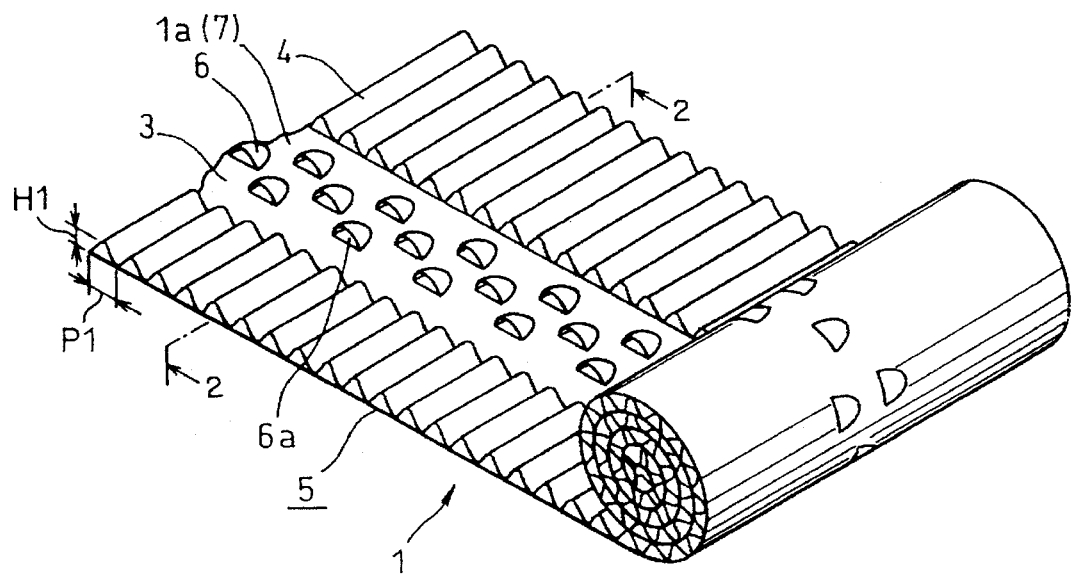
FIG. 1 is a schematic perspective view of a metal carrier suited to being coated with a catalyst for purifying the exhaust gases.
Figure 2:
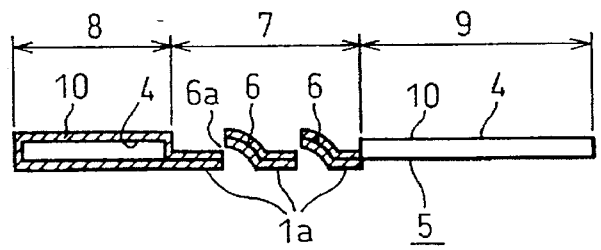
FIG. 2 is a sectional view taken along the line 2—2 in FIG. 1.
Figure 3:
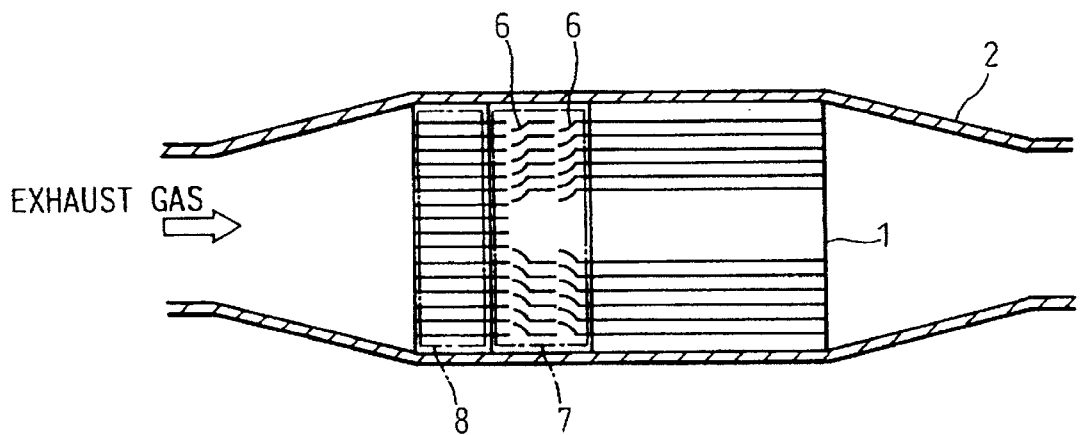
FIG. 3 is a sectional view of a metal carrier suited to being coated with a catalyst which is housed in an exhaust pipe of an internal combustion engine.

As can be seen in FIGS. 1 and 2, a circular-cylindrical metallic catalyst carrier 1 is made of a plate assembly 5 which is comprised of a thin metal planar plate 3 and a corrugated thin metal plate 4 welded to the plate 3. The plate assembly 5 is rolled into a cylindrical shape having a honeycomb structure. The catalyst carrier 1 is housed in an exhaust pipe 2 of an internal combustion engine as shown in FIG. 2. The corrugated plate 4 is provided with a number of triangular projections (or grooves) in cross section, whose pitch P1 is 2.5 mm and height H1 (distance between the apexes of the projections and the bottoms of the grooves) is 1.3 mm in the illustrated embodiment. The exhaust gases pass through the carrier. The carrier 1 has no corrugated portion provided by the corrugated plate 4 at the intermediate portion thereof located slightly upstream the median of the carrier 1 in the axial direction thereof, i.e., in the flow direction of the exhaust gases.

The intermediate portion 1a of the carrier 1 in which there is no corrugated portion is provided with a large number of louvers 6 on the planar plate 3. The louvers 6 are formed by press-machining the planar plate 3 so that each louver 6 is in the form of a substantially semi-spherical cap having an opening 6a that faces the upstream side as viewed in the direction of the flow of the exhaust gases. The louvers 6 project toward the center of the planar-corrugated plate assembly 5 when the latter is rolled in a solid circular cylinder form. The intermediate portion provided with the louvers 6 constitutes a turbulence producing portion 7. Namely, the haphazard secondary motion is caused by the louvers 6 in the exhaust gases, so that the heat of the exhaust gases can be effectively transmitted toward the outer peripheral portion of the cylindrically rolled carrier 1. A three-way catalyst is carried on the surface of the carrier 1. Namely, the carrier 1 is coated, at the outer entire peripheral surface thereof, with a catalytic layer 10. The catalytic layer 10 is made of porous alumina particles ($Al_2O_3$), platinum fine particles (Pt), rhodium fine particles (Rh), and fine ceria particles ($CeO_2$), as a promoter, in combination. More precisely speaking, fine particles of platinum and rhodium are dispersed and applied onto the surface of the porous alumina, and in addition, fine particles of ceria as an auxiliary catalyst are dispersed and applied to the surface of the porous alumina. In the illustrated embodiment, the amount (thickness or density) of the catalyst at the turbulence producing portion 7 and the upstream portion 8 thereof differs from the amount (thickness or density) of the catalyst at the remaining portion (downstream portion) 9 of the carrier 1. Namely, the amount of the catalyst of the catalytic layer 10 at the turbulence producing portion 7 and its upstream portion 8 is larger than the amount of the catalyst of the catalytic layer 10 at the remaining portion. In an example, the amounts of platinum and rhodium at the turbulence producing portion 7 and its upstream portion 8 are 4.5 g/liter and 0.9 g/liter, respectively; and the amounts of platinum and rhodium at the remaining portion are 1.5 g/liter and 0.3 g/liter, respectively. Generally speaking, 1.5 g/liter of platinum and 0.3 g/liter of rhodium are uniformly scattered on the surface of the carrier suited to being coated with a catalyst, but in the illustrated embodiment of the present invention, the amounts of platinum and rhodium to be dispersed onto the turbulence producing portion 7 and its upstream portion 8 are three times the respective amounts at the remaining portion.

Note that the unit "g/liter" for each substance refers to the weight per unit volume of the carrier suited to being coated with a catalyst. The reason that the amount of the catalyst of the catalytic layer 10 at the upstream portion 8 of the turbulence producing portion 7 is more than the amount of the catalyst at the remaining portion 9 is that when the catalytic layer 10 is formed on the turbulence producing portion, the carrier 1 is dipped in the paste from one axial end (e.g., upstream end) of the carrier, and hence, the paste is automatically applied not only to the turbulence producing portion 7, but also to the upstream portion 8. According to the basic concept of the invention, only the turbulence producing portion 7 needs to be coated with a larger amount of the catalyst.

The exhaust gas purifying apparatus as constructed above operates as follows.

Before the engine starts, the catalyst carrier 1 is cold. When the engine starts, the high temperature (e.g., 350° C.) exhaust gases pass through the catalyzer. As a result, the exhaust gases are made turbulent by the turbulence producing portion 7 of the carrier 1 during the passage through the catalyzer, so that the temperature of the turbulence producing portion quickly becomes high. Consequently, the catalytic layer 10 of the turbulence producing portion 7 rises in temperature and is activated. As a result, the activation rapidly propagates throughout the overall catalytic layer attached to the carrier 1.

Figure 4:
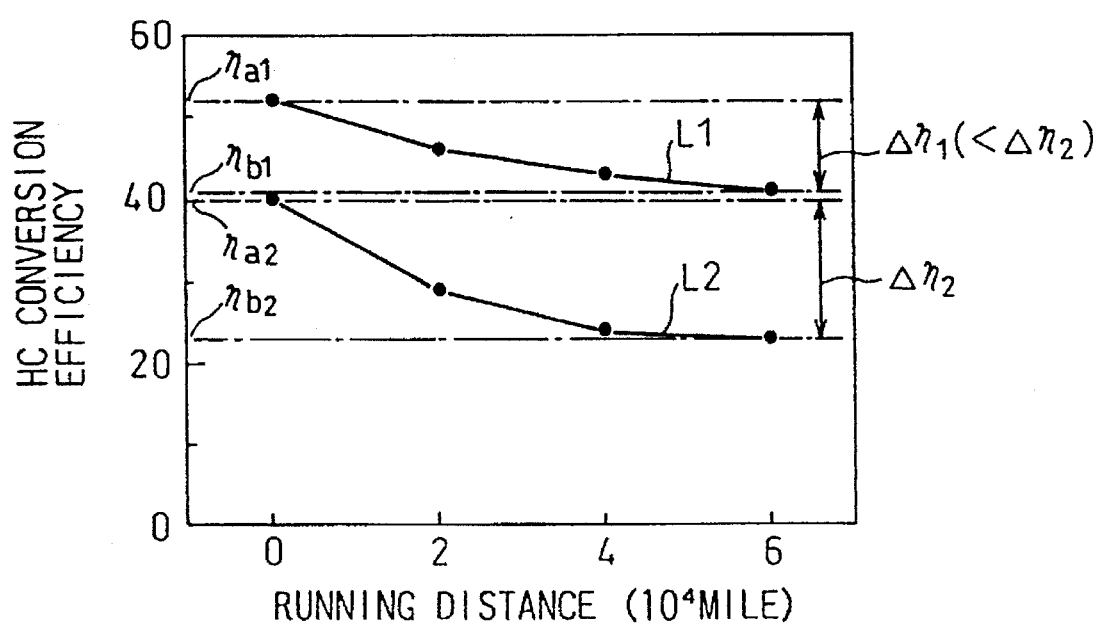
FIG. 4 is a graph showing experimental results of the conversion efficiency which is lowered in accordance with the aging of the catalyst.

When the exhaust gases pass through the metal carrier 1, the harmful components of the exhaust gases, i.e., HC, CO, NOx can be reduced by the catalyzer. It should be recalled here that in the catalyzer having the turbulence producing portion 7, the temperature of the turbulence producing portion remains very high even after the catalyst layer 10 is entirely activated, and hence, the catalyst 10 of the turbulence producing portion 7 tends to age relatively quickly. However, in the present invention, since the catalyst (Pt and Rh) attached to the turbulence producing portion 7 of the carrier 1 which would otherwise tend to be aged quickly is three times the amount of the catalyst of the remaining portion of the carrier 1, the aging rate is reduced as a whole. Namely, the conversion efficiency of the catalyzer lasts for a long time. FIG. 4 shows the experimental results of the exhaust gas purifying efficiency in accordance with the aging of the catalyst. The deterioration of the catalyst is represented by the distance traveled by an automobile in which the catalyzer is provided. The conversion efficiency is represented by the HC conversion efficiency, i.e., the rate between the amounts of HC contained in the exhaust gases before and after the passage of the exhaust gases through the catalyzer for twenty seconds reckoned from the start of the engine. In FIG. 4, the line L1 designates the characteristics of the catalyzer according to the present invention in which the amount of the catalyst attached to the turbulence producing portion 7 of the carrier 1 and the upstream portion 8 thereof was three times the amount of the catalyst (Pt and Rh) attached to the remaining portion of the carrier 1; whereas the line L2 designates the characteristics of a catalyzer for comparison, in which the carrier was uniformly coated with a constant thickness of catalyst (Pt and Rh).

In FIG. 4, assuming that the difference $\Delta\eta_1$ between the HC conversion efficiency $\eta a$ when the traveled distance is zero and the HC conversion efficiency $\eta b$ when the traveled distance is sixty thousand miles is for the characteristics L1 and the corresponding difference for the characteristics L2 is $\Delta\eta_2$, respectively, the difference $\Delta\eta_1$ for the characteristics L1 is smaller than the difference $\Delta\eta_2$ for the characteristics L2. Namely, it can be understood that according to the present invention, the aging rate of the catalyst is reduced and the catalyzer exhibits a good purifying efficiency for a long period of time, in comparison with the prior art.

As mentioned above, according to the illustrated embodiment of the present invention, a part of the carrier 1 including the turbulence producing portion 7 is coated with a larger amount of catalyst than that of the catalyst with which the remaining portion of the substrate is to be coated. Consequently, when the high temperature exhaust gases pass through the catalyzer, the temperature of the turbulence producing portion 7 rises, so that the catalytic layer thereon can be activated. The activation propagates throughout the entire catalytic layer attached to the outer surface of the carrier. Even after the catalytic layer is entirely activated, the temperature of the turbulence producing portion 7 where the exhaust gases are made turbulent remains high. Nevertheless, since the catalytic layer formed on the turbulence producing portion 7 and the upstream portion 8 of the carrier 1 is thicker than that formed on the remaining portion of the carrier 1, the aging rate of the catalyst can be reduced and hence, the purifying efficiency lasts a long time.

A second embodiment of the present invention will be discussed below. The following discussion will be mainly addressed to differences between the first and second embodiments.

Unlike the first embodiment in which the predetermined portion of the carrier 1 including the turbulence producing portion 7 and an additional region or upstream region 8 located adjacent to the predetermined region are coated with a larger amount of catalyst (Pt and Rh) in comparison with the catalyst on the remaining portion 9 of the carrier 1, in the second embodiment, the predetermined portion including the turbulence producing portion 7 and an additional region 8 located adjacent to the predetermined region are coated with 4 g/liter of palladium (Pd). The remaining portion 9 is coated with 1.5 g/liter of platinum (Pt) and 0.3 g/liter of rhodium (Rh), similar to the first embodiment. In general palladium (Pd) is less expensive, exhibits higher thermal resistance, and tends to age more slowly than platinum (Pt) or rhodium (Rh). Palladium is not fully satisfactory from the viewpoint of purifying capability for NOx (i.e., a high purifying efficiency for NOx can be expected from an aged palladium), but the platinum and rhodium provided on the remaining portion of the carrier can ensure the purifying capability of a catalyzer as a whole.

As can be seen from the foregoing, according to the second embodiment of the present invention, the catalyst with which the predetermined portion of the carrier 1 including the turbulence producing portion 7 and an additional region 8 located adjacent to the predetermined region are coated has a stronger thermal resistance than the catalyst with which the remaining portion 9 of the substrate is coated. Consequently, the aging rate of the catalyst can be reduced and hence, good purifying efficiency can be maintained for a long period of time.

A third embodiment of the present invention will be discussed below. The discussion is chiefly directed to differences between the first embodiment and the third embodiment.

In the third embodiment, the amount of ceria ($CeO_2$) as a promoter with which the turbulence producing portion 7 and the upstream portion 8 are coated is larger than the amount of that for the remaining portion of the carrier 1. Concretely, the turbulence producing portion 7 and the upstream portion 8 are coated with 72.2904 g/liter (0.2 mol/liter) of ceria ($CeO_2$), and the remaining portion of the carrier 1 is coated with 36.1452 g/liter (0.1 mol/liter) of ceria, respectively. Namely, in the prior art, usually, 36.1452 g/liter (0.1 mol/liter) is uniformly added, but in the present invention, the amount of ceria coating the turbulence producing portion 7 and the upstream portion 8 therewith is twice the amount of ceria coating the remaining portion of the carrier.

Generally speaking, ceria is often added to reserve or discharge oxygen by or from the three-way catalyst to thereby reduce the deterioration of the conversion efficiency when the air-fuel ratio deviates from a stoichiometric value. If the ceria is aged, the oxygen reserving capability thereof is reduced, and consequently, the conversion efficiency can be reduced. However, in the present invention, since a larger amount of ceria is contained in the catalyst on the turbulence producing portion 7 which tends to age due to the high temperature thereat, the reduction of the conversion efficiency can be reduced.

As can be seen from the above discussion, according to the third embodiment of the present invention, since the amount of the promoter at the predetermined portion of the carrier 1 including the turbulence producing portion 7 and an additional region located adjacent to the predetermined region are greater than the amount of the promoter at the remaining portion of the carrier, the aging rate of the promoter is reduced to thereby restrict the reduction of the exhaust gas conversion efficiency. The basic concept of the third embodiment can be equally applied when barium (Ba), or lanthanum (La), etc., is used as a promoter.

Namely, in such an application, the amount of barium or lanthanum, etc., added to the catalytic layer for the turbulence producing portion and the upstream portion of the carrier is greater than the amount of that added to the remaining portion of the carrier.

Although, the turbulence producing means is realized by the louvers 6 in the illustrated embodiments, it is possible to provide a meshed plate instead of the louvers in order to produce the turbulence. Also, although the honeycomb carrier suited to being coated with a catalyst is made of laminated thin flat metal plate and corrugated thin metal plate that are rolled in the above-mentioned embodiments, the honeycomb carrier suited to being coated with a catalyst can be made of multi-layered flat metal plates and corrugated metal plates that are rolled to have a honeycomb structure.

As may be understood from the above discussion, according to the present invention, the reduction in the exhaust gas conversion efficiency of the exhaust gas purifying apparatus can be reduced.

Finally, it should be understood that many modifications and variations will occur to a person skilled in the art without departing from the spirit and scope of the accompanying claims.

We claim:

1. An exhaust gas purifying apparatus comprising:

a catalyst carrier having a flat metal plate and a corrugated metal plate rolled into a cylindrical shape having a honeycomb structure, the flat metal plate and the corrugated metal plate having surfaces defining axially extending passageways for permitting an exhaust gas to flow therethrough;

the catalyst carrier having an upstream portion including the flat metal plate and the corrugated metal plate, a downstream portion including the flat metal plate and the corrugated metal plate, and a turbulence producing portion arranged between the upstream portion and the downstream portion and including the flat metal plate only, louvers for causing turbulence in the flow of exhaust gas flowing therethrough being defined substantially only in the flat metal plate of the turbulence producing portion;

a layer of catalyst being carried by surfaces of the flat metal plate and the corrugated metal plate of the catalyst carrier for reducing a pollutant contained in the exhaust gas; and the amount of catalyst carried by a region of the catalyst carrier including at least the turbulence producing portion of the catalyst carrier being greater than the amount of catalyst carried by a remaining region of the catalyst carrier.

2. An exhaust gas purifying apparatus as claimed in claim 1, wherein said downstream portion comprises said remaining region.

3. An exhaust gas purifying apparatus comprising:

a catalyst carrier having a flat metal plate and a corrugated metal plate rolled into a cylindrical shape having a honeycomb structure, the flat metal plate and the corrugated metal plate having surfaces defining axially extending passageways for permitting an exhaust gas to flow therethrough;

the catalyst carrier having an upstream portion including the flat metal plate and the corrugated metal plate, a downstream portion including the flat metal plate and the corrugated metal plate, and a turbulence producing portion arranged between the upstream portion and the downstream portion and including the flat metal plate only, louvers for causing turbulence in the flow of exhaust gas flowing therethrough being defined substantially only in the flat metal plate of the turbulence producing portion;

a layer of catalyst carried by surfaces of the flat metal plate and the corrugated metal plate of the catalyst carrier for reducing a pollutant contained in the exhaust gas; and a thermal resistance of catalyst carried by a region of the catalyst carrier including at least the turbulence producing portion of the catalyst carrier being higher than a thermal resistance of catalyst carried by a remaining region of the catalyst carrier.

4. An exhaust gas purifying apparatus as claimed in claim 3, wherein said downstream portion comprises said remaining region.

5. An exhaust gas purifying apparatus comprising:

a catalyst carrier having a flat metal plate and a corrugated metal plate rolled into a cylindrical shape having a honeycomb structure, the flat metal plate and the corrugated metal plate having surfaces defining axially extending passageways for permitting an exhaust gas to flow therethrough;

the catalyst carrier having an upstream portion including the flat metal plate and the corrugated metal plate, a downstream portion including the flat metal plate and the corrugated metal plate, and a turbulence producing portion arranged between the upstream portion and the downstream portion and including the flat metal plate only, louvers for causing turbulence in the flow of exhaust gas flowing therethrough being defined substantially only in the flat metal plate of the turbulence producing portion;

a layer of catalyst carried by surfaces of the flat metal plate and the corrugated metal plate of the catalyst carrier for reducing a pollutant contained in the exhaust gas;

the layer of catalyst including promoter for reserving or discharging oxygen from the catalyst to thereby reduce the deterioration of the conversion efficiency; and an amount of promoter carried by a region of the catalyst carrier including at least the turbulence producing portion of the catalyst carrier being greater than an amount of promoter carried by a remaining region of the catalyst carrier.

6. An exhaust gas purifying apparatus as claimed in claim 5, wherein said downstream portion comprises said remaining region.

* * * * *